United States Patent [19]

Howden et al.

[11] 4,357,383

[45] Nov. 2, 1982

[54] METALLIZED FILMS

[75] Inventors: Martin E. Howden, Hertford; Robert C. Lansbury, St. Albans, both of England

[73] Assignee: Imperial Chemical Industries Limited, London, England

[21] Appl. No.: 166,747

[22] Filed: Jul. 7, 1980

Related U.S. Application Data

[63] Continuation-in-part of Ser. No. 83,958, Oct. 11, 1979, abandoned.

[30] Foreign Application Priority Data

Jul. 27, 1979 [GB] United Kingdom ............... 7926306

[51] Int. Cl.³ .................... B32B 7/02; B32B 27/08
[52] U.S. Cl. .................. 428/213; 428/215; 428/216; 428/218; 428/220; 428/335; 428/461; 428/515; 428/516
[58] Field of Search ............... 428/461, 516, 215, 216, 428/218, 220, 335, 336, 213, 515

[56] References Cited

U.S. PATENT DOCUMENTS

| | | | |
|---|---|---|---|
| 3,527,667 | 9/1970 | Larsen et al. | 428/461 |
| 4,105,820 | 8/1978 | Antoni | 428/461 X |
| 4,131,518 | 12/1978 | Fromson | 428/461 X |
| 4,172,912 | 10/1979 | Noji et al. | 428/461 X |
| 4,172,915 | 10/1979 | Sheptak et al. | 428/461 X |

FOREIGN PATENT DOCUMENTS 875949 7/1971 Canada .
1440317 6/1976 United Kingdom .

OTHER PUBLICATIONS

Montecatini, Translation of Italian Patent No. 690911, 6/1965, 10 pages.

Primary Examiner—Thomas J. Herbert, Jr.
Attorney, Agent, or Firm—Cushman, Darby & Cushman

[57] ABSTRACT

The invention provides a multiple-layer metallized film comprising a substrate layer of a polymer or copolymer of an alpha-olefin, the molecule of which contains from 2 to 6 carbon atoms, having on at least one surface thereof an adherent layer comprising a random copolymer of ethylene with from 0.5 to 15 wt % of a 3 to 6 carbon alpha-mono-olefin, and a metallic layer on the surface of the adherent layer remote from the substrate. Improved adhesion between the metallized and substrate layers is thereby achieved, and the multi-layer film is suitable for packaging a variety of edible products.

10 Claims, 3 Drawing Figures

METALLIZED FILMS

This is a continuation-in-part application of our U.S. Ser. No. 83,958 filed Oct. 11, 1979, and now abandoned.

This invention relates to a metallised film, and in particular to a metallised polyolefin film.

Metallic foils, such as aluminium foil, which hitherto have been employed as packaging materials for snack foods, bakery products, potato crisps, coffee beans etc, are increasingly being replaced by less costly composite structures comprising a substrate of a polymeric film coated with a thin metallic layer. The polymeric film substrate generally provides a strong, flexible packaging medium offering desirable oxygen and moisture barrier properties, and these characteristics are supplemented by the presence of the metallic layer which additionally provides a barrier to visible and ultraviolet light thereby delaying the onset of oxidative rancidity to which packaged products prepared with, or cooked in, edible oil are particularly vulnerable. However, such composite packaging materials, particularly those with a polyolefin film substrate, tend to become defective as a result of poor adhesion between the substrate and metallic layer. Resistance to scuffing of printed matter on the composite materials is also often less than satisfactory.

We have now devised an improved metallised film.

Accordingly, the present invention provides a multiple-layer metallised film comprising a substrate layer of a polymer or copolymer of an alpha-olefin, the molecule of which contains from 2 to 6 carbon atoms, having on at least one surface thereof an adherent layer comprising a random copolymer of ethylene with from 0.25 to 15% by weight of the copolymer of an alpha-mono-olefin containing from 3 to 6 carbon atoms in its molecule, and a metallic layer on the surface of said adherent layer remote from the substrate.

Suitable substrate materials are polymers and copolymers of alpha-olefins—such as ethylene, propylene, butene-1, 4-methylpentene-1, and hexene-1, a preferred substrate for packaging applications being a substantially crystalline propylene homo- or block co-polymer, the latter containing, for example, up to 15% by weight of the copolymer of another copolymerisable alpha-olefin, such as ethylene.

The alpha-mono-olefin component of the adherent ethylene copolymer layer may be propylene, pentene-1, 4-methylpentene-1 or hexene-1, although butene-1 is a preferred comonomer. To ensure acceptable adhesion between the substrate and adherent ethylene copolymer layer the alpha-mono-olefin content of the latter should not be less than 0.25 weight %. Preferably, the alpha-mono-olefin constitutes from 0.5 to 10, particularly preferably from 2.0 to 6.0, % by weight of the ethylene copolymer. A random ethylene-butene-1 copolymer containing about 4.0 weight % of butene-1 has proved to be particularly satisfactory.

An ethylene copolymer suitable for the formation of an adherent layer on a substrate as hereinbefore defined preferably has a density of from 0.910 to 0.980 g/cm$^3$ at 23° C. Selection of an ethylene copolymer having a density within the specified range is of importance in ensuring an acceptable degree of adhesion between the substrate and adherent layer. Furthermore, if at least a portion of the adherent layer is required to exhibit acceptable heat-sealing behaviour, it is preferred that the copolymer has a density at 23° C. of from about 0.920 to about 0.950, particularly preferably from about 0.930 to about 0.945.

The production of metallised films having acceptable optical characteristics may be assisted by selecting an ethylene copolymer having a melt flow index, measured in accordance with ASTM/D 1238-65T (condition E), of from 1.5 to 10 g/10 minutes, and preferably of from 2 to 5.5 g/10 minutes. Suitable ethylene copolymers therefore exhibit a molecular weight (weight average) of from about 110,000 to about 55,000, and preferably from about 95,000 to about 60,000. A preferred ethylene-butene-1 copolymer exhibits a melt flow index of about 3.0 g/10 minutes.

If desired, the optical characteristics of the films of the invention may be further improved by restricting the choice of ethylene copolymer for the adherent layer(s) to one having a relatively narrow molecular weight distribution—for example, Mw/Mn of from 3 to 5, preferably from 3.25 to 3.75, wherein Mw and Mn are respectively the weight and number average molecular weights.

Desirably, the ethylene copolymer exhibits a melting temperature range, as hereinafter defined, of from about 105° to 130° C.

Formation of an ethylene copolymer suitable for use in the multiple-layer films of the invention is conveniently effected in the presence of an "organometallic" catalyst, such as a transition metal compound with an organometallic activator. Particularly useful compounds of this type are trivalent titanium compounds activated with aluminium alkyl compounds. A preferred material is titanium trichloride obtained by reduction of titanium tetrachloride either with an aluminium alkyl compound or with aluminium metal, with an aluminium alkyl halide as activator. Alternatively, a supported metal oxide catalyst system may be employed—particularly a finely-divided chromium oxide catalyst on a high surface area silica/alumina support. Such catalyst systems yield substantially crystalline ethylene copolymers suitable for use according to the invention.

Application of the ethylene copolymer layer on to the substrate is conveniently effected by any of the laminating or coating techniques conventionally employed in the production of composite films. Preferably, however, the ethylene copolymer layer is applied to the substrate by means of a melt- or extrusion-coating technique in which either a molten layer of the copolymer is extruded directly onto the surface of a preformed substrate, or the polymeric components of the substrate and adherent layer are coextruded into intimate contact while each is still molten. Preferably, the coextrusion is effected from a multi-channel annular die so designed that the molten polymeric components constituting individual layers of the composite film merge at their boundaries within the die to form a single composite structure which is then extruded from a common die orifice in the form of a tubular extrudate.

Preferably, the composite structure comprising the substrate and adherent layer is stretched to orient the substrate, prior to deposition of a metallic layer onto the adherent layer. Orientation may be effected uniaxially, by stretching the film in one direction, or biaxially, by stretching the film in each of two mutually perpendicular directions in the plane of the film, and the biaxial orientation may be balanced or unbalanced, for example with the higher degree of orientation of an unbalanced film in a preferred direction—usually the longitudinal or machine direction. Conveniently, the polyolefin substrate material and the adherent ethylene copolymer layer are coextruded in the form of a composite tube which is subsequently quenched, reheated, and then expanded by internal gas pressure to induce transverse orientation, and withdrawn at a rate greater than that at which it is extruded to stretch and orient it in the longitudinal direction. Alternatively, a flat, copolymer-coated film may be oriented by simultaneous or sequential stretching in each of two mutually perpendicular directions by means of a stenter, or by a combination of draw rolls and a stenter.

The degree to which the film is stretched depends to some extent on the ultimate use for which the film is intended, but for a polypropylene-based packaging film we find that satisfactory tensile and other properties are developed when the film is stretched to between three and ten, preferably, seven, times its original dimensions in each of the transverse and longitudinal directions.

After stretching, the polymeric film is normally "heat-set", while restrained against shrinkage, at a temperature above the glass transition temperature of the polymer and below its melting point. The optimum heat-setting temperature can readily be established by simple experimentation, and for a polypropylene substrate, "heat-setting" is conveniently effected at temperatures in the range of from 100° C. to 140° C. Heat-setting may be effected by conventional techniques—for example by means of a stenter system, or by a system of one or more heated rollers as disclosed, for example, in British patent No. 1 124 886.

Prior to deposition of the metallic layer onto the adherent copolymer layer the exposed surface thereof is preferably subjected to a chemical or physical surface-modifying treatment to improve the bond between that surface and the subsequently applied metallic layer. A preferred treatment, because of its simplicity and effectiveness, is to subject the exposed surface of the adherent layer to a high voltage electrical stress accompanied by corona discharge. The discharge treatment is most effective when applied to a hot film structure.

Although a corona discharge treatment is a preferred technique for improving the bonding properties of the adherent surface, the treatment induces an electrostatic charge on that surface, and it is desirable that this charge should be eliminated to facilitate handling of the film structure prior to metallising. Preferably, therefore, the discharge-treated structure is destaticized before metallising, for example by directing a current of ionized air against the charged surface and subsequently subjecting the treated surface to a vacuum, suitably by reeling the film structure through an evacuated chamber.

Deposition of a metallic layer onto the adherent copolymer layer may be effected by conventional metallising techniques—for example, by laminating a preformed metallic foil to the copolymer layer, by deposition from a suspension of finely-divided metallic particles in a suitable liquid vehicle, or, preferably, by a vacuum deposition process in which a metal is evaporated onto the receptive copolymer surface in a chamber maintained under conditions of high vacuum. Suitable metals include nickel, copper (and alloys thereof, such as bronze), silver, gold and zinc, but aluminium is to be preferred for reasons both of economy and ease of bonding to the copolymer layer.

Metallising may be effected over the entire exposed surface of the copolymer layer or over only selected portions thereof. In a preferred embodiment of the invention strip metallising may be effected whereby longitudinal edge portions of the copolymer layer are left unmetallised. The resultant edge portions of exposed copolymer enable packages to be formed from the metallised film by conventional heat-sealing techniques in which the unmetallised zones of the ethylene copolymer are fused together.

The metallic layer adheres well to the ethylene copolymer layer which, being entirely alpha-olefinic in nature, is compatible with, and therefore strongly adherent to, the entirely alpha-olefinic substrate layer. Effective bonding of the metallic layer to the substrate film is therefore achieved in the absence of a separately applied non-alpha-olefinic adhesive primer medium. An effective metallised film is therefore produced by a relatively simple and inexpensive technique.

Composite films in accordance with the present invention may be prepared in a range of thicknesses governed primarily by the ultimate application for which a particular film is to be employed. Films, having a total thickness in a range extending from 2.5 to 150 microns are of general utility, but for packaging applications we prefer to employ a packaging film of from about 10 to 50 microns in total thickness.

The ratio of substrate to ethylene copolymer layer thickness may vary within a wide range, although we prefer that the thickness of the copolymer layer should not be less than 0.2% (preferably 0.5%), nor greater than 50% of that of the substrate. In practice, the thickness of the ethylene copolymer layer is desirably at least 0.05 micron and preferably should not greatly exceed about 1.0 micron, a particularly suitable range of thickness being from 0.3 to 0.9 micron. The metallic layer is conveniently deposited in a thickness from monoatomic proportions to about 50 microns or greater, although a preferred range is from 0.005 to 15.0 microns, and particularly from 0.01 to 0.05 micron.

If desired, both of the substrate surfaces may be provided with an ethylene copolymer adherent layer, and one or both of these two copolymer layers may be metallised. Alternatively, one surface of the substrate may be uncoated, or may be coated with a layer of a material other than the herein specified ethylene copolymer depending on the properties required of the film for a particular application.

If desired, the substrate layer may include a portion of scrap polymeric material, both substrate and/or adherent layer(s), reclaimed from a previously produced unmetallised multiple-layer film. Conveniently, the reclaimed material constitutes from 25 to 50%, preferably from 30 to 45%, by weight of the substrate layer, but reclaim levels within an extensive range on either side of these values can be tolerated.

If desired, the adhesion characteristics of films according to the invention may be improved by incorporating into the ethylene copolymer layer a portion of a compatible polymeric material, particularly a further olefin copolymer, a substantial proportion of which melts in a temperature range of from about 115° C. to 130° C., the melting temperature being defined as the peak of the Differential Scanning Calorimetry melting endotherm observed in respect of a polymer sample in the reheating stage of a thermal cycle in which the sample has been heated from room temperature to 160° C. (230° C. for a predominantly propylene polymer), held at that temperature for 2 minutes (5 minutes for a predominantly propylene polymer), cooled to room temperature, and reheated, each of the heating, cooling and reheating stages in the cycle being effected at a rate of 20° C. per minute.

One or more of the polymeric layers of the composite films of the present invention may conveniently contain any of the additives conventionally employed in the manufacture of thermoplastic films.

Application of decorative and/or descriptive matter to the films of the invention may be effected by conventional printing techniques, for example—by printing an inked pattern directly onto the metallic surface of the film and, optionally, protecting the printed matter by a layer of a protective lacquer. Alternatively, reverse printing techniques may be employed whereby the printed matter is embedded in the film at an interlayer position.

BRIEF DESCRIPTION OF THE DRAWINGS

The invention is illustrated by reference to the accompanying drawings in which

Referring to FIG. 1 of the drawings, the film comprises a polyolefin substrate layer 1 having a metallic layer 2 bonded to one surface 3 thereof by an intermediate adherent layer 4 of an ethylene copolymer according to the invention. Surface 5 of the substrate, remote from metallic layer 2, is uncoated.

Figure 1:
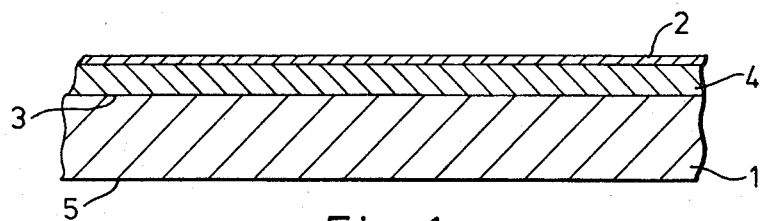
FIG. 1 is a schematic sectional elevation, not to scale, of a polyolefin film having a single metallic surface layer.
Figure 2:
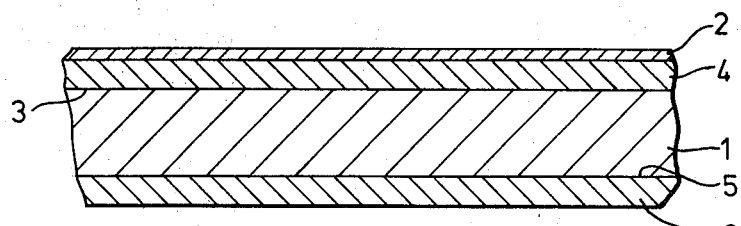
FIG. 2 is a similar schematic elevation of a polyolefin film having respectively a metallic and a polymeric heat-sealable surface layer.

The film of FIG. 2 additionally comprises a layer 6 of, for example, a polymeric heat-sealable medium bonded to the remote substrate surface 5.

Figure 3:
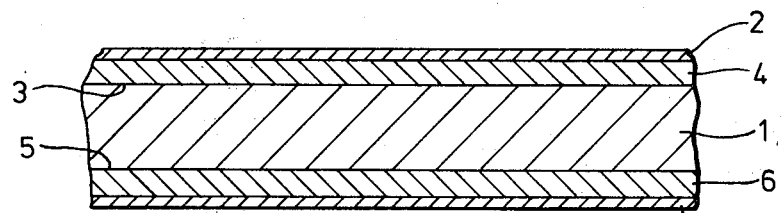
FIG. 3 is a similar schematic elevation of a multilayer polyolefin film metallised on both opposed surfaces.

The film of FIG. 3 further comprises a second metallic layer 7 bonded to an intermediate adherent layer 6 of an ethylene copolymer according to the invention, layer 6 in turn being directly bonded to substrate surface 5.

The invention is further illustrated by reference to the following Examples:

EXAMPLE 1

From a triple channel annular die were coextruded a propylene homopolymer and an ethylene-propylene random copolymer containing about 3.5% by weight of propylene so as to form a polypropylene tube the internal and external surfaces of which were coated with a layer of the ethylene-propylene copolymer.

The ethylene-propylene copolymer had a density of 0.943, a melt flow index (ASTM/D1238-65T—condition E) of 5.0, and a melting temperature, measured as hereinbefore described, of about 126° C.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to seven times its original dimensions in both the direction of extrusion and in a direction transverse thereto.

The stretched tubular film was then opened out to form flat film which was subsequently heat-set at a temperature of 120° C. on a matt-surfaced roller heat-setter of the kind described in British Patent No. 1 124 886.

Discharge treatment of the heat-set film supported over a heated roll was effected by a single aluminium rod electrode extending across the entire width of the film, and connected to a Sherman GT60 solid state corona treater operating at 6 amps.

The thickness of the ethylene-propylene copolymer layer on each surface of the resultant film was 0.4 micron, the substrate having a thickness of about 25 microns.

One surface of the film was then metallised with a layer of aluminium (0.02 micron) by reeling the film through a conventional vacuum metallising unit operating at a pressure of $10^{-4}$ torr.

The metallic surface had a sparkling, lustrous appearance.

To test the adhesion of the metallic layer to the film a strip of "Magic" pressure-sensitive adhesive tape (Minnesota Mining & Manufacturing Co) approximately 25 mm wide and 250 mm long was applied to the metallic surface under manual pressure, and then slowly peeled back, at an angle of 180° to the film surface, from the area under test. Visual inspection of the film surface established that virtually no metal had been removed by the "peel" test.

A sample of the film was then overcoated, on the metallic surface, with a layer of a gold protective lacquer ink (Coates) by means of a conventional Dixon coating unit. A repeat of the aforementioned "peel" test on the lacquered surface removed approximately 5% of the lacquer and metal from the film substrate in the area under test.

EXAMPLE 2

This is a comparative Example not according to the invention.

The procedure of Example 1 was repeated save that the ethylene-propylene copolymer layer on the polypropylene film substrate was replaced by a blend of 60 parts by weight of a propylene-butene-1 copolymer (14 wt % butene-1) and 40 parts by weight of a butene-1 homopolymer.

The resultant metallised film had a dull appearance. Application of the hereinbefore described "peel" test to the unlacquered film resulted in removal of more than 50% of the metallic layer, while a similar test on a sample of the gold-lacquered film resulted in removal of approximately 65% of lacquer and metal (aluminium) from the area under test.

EXAMPLE 3

The procedure of Example 1 was repeated save that the core of the triple-layer coextruded film was a propylene-ethylene block copolymer containing approximately 6 weight percent of ethylene rather than a propylene homopolymer. The narrow angle haze of the coextruded film, prior to metallising, was slightly inferior to that of Example 1.

The resultant metallised film had a slightly dull appearance, but adhesion of the metallic layer to the ethylene-copolymer layer, as determined by the tape test, was excellent, and the film was suitable for use in forming packages for a variety of edible products.

EXAMPLES 4 TO 16

The procedure of Example 1 was repeated to produce a range of metallised films save that the composition of the ethylene copolymer layer and the thickness thereof on the polypropylene film substrate were varied in accordance with the following Table, each of the films being heat-set and discharge treated, prior to metallising with aluminium as described in Example 1.

The resultant films had a sparkling lustrous appearance and, as shown by the tape test, adhesion of the metallic layer to the various substrates was excellent. The films were of utility in packaging a variety of snack foods.

TABLE

| | Ethylene Copolymer | | | | | | Tape Peel Test | |
|---|---|---|---|---|---|---|---|---|
| | Comonomer* | | Density g/cm$^3$ | Melt Flow Index g/10 min | Melt Temp °C. | Coat Thickness μm | (a)** Metal % | (b) Removed % |
| Example | | Content wt % | | | | | | |
| 4 | B | 2.8 | 0.935 | 7.4 | 124 | 0.2 | | |
| 5 | B | 2.8 | 0.935 | 7.4 | 124 | 0.4 | | |
| 6 | B | 3.9 | 0.933 | 3.0 | 124 | 0.2 | 0 | 0 |
| 7 | B | 3.9 | 0.933 | 3.0 | 124 | 0.4 | 0 | 0 |
| 8 | B | 8.5 | 0.926 | 9.0 | 122 | 0.2 | 0 | 0 |
| 9 | B | 8.5 | 0.926 | 9.0 | 122 | 0.4 | 0 | 0 |
| 10 | P | 1.6 | 0.949 | 9.0 | 126 | 0.2 | 0 | 0 |
| 11 | P | 1.6 | 0.949 | 9.0 | 126 | 0.4 | 0 | 0 |
| 12 | P | 2.1 | 0.950 | 9.5 | 126 | 0.2 | 0 | 0 |
| 13 | P | 2.1 | 0.950 | 9.5 | 126 | 0.4 | 0 | 0 |
| 14 | P | 4.0 | 0.943 | 5.0 | 128 | 0.4 | 0 | 0 |
| 15 | H | 6.3 | 0.926 | 1.5 | 124 | 0.2 | 5 | 0 |
| 16 | H | 6.3 | 0.926 | 1.5 | 124 | 0.4 | 0 | 0 |

*B = Butene—1
P = Propylene
H = Hexene—1
**(a) = unlacquered film
(b) = gold lacquered film

We claim:

1. A multiple-layer metallised packaging film of total thickness between 2.5 and 150 microns said film comprising a substrate layer of a polymer or copolymer of an alpha-olefin, the molecule of which contains from 2 to 6 carbon atoms, having on at least one surface thereof an adherent layer comprising a random copolymer of ethylene with from 0.25 to 15% by weight of the copolymer of an alpha-mono-olefin containing from 3 to 6 carbon atoms in its molecule, and a metallic layer on the surface of said adherent layer remote from the substrate, said metallic layer having a thickness of from monoatomic proportions to 50 microns.

2. A film according to claim 1 wherein the adherent layer comprises a random ethylene-butene-1 copolymer.

3. A film according to claim 1 wherein the density of the ethylene copolymer is from 0.910 to 0.980 g/cm$^3$ at 23° C.

4. A film according to claim 1 wherein the ethylene copolymer has a melt flow index, measured in accordance with ASTM/D 1238-65T (condition E), of from 1.5 to 10.0 g/10 minutes.

5. A film according to claim 1 wherein the ethylene copolymer has a ratio Mw:Mn of from 3:1 to 5:1 wherein Mw and Mn are respectively the weight and number average molecular weights of said ethylene copolymer.

6. A film according to claim 1 wherein said adherent layer additionally comprises an olefin copolymer a substantial proportion of which melts in a temperature range of from 115° to 130° C.

7. A film according to claim 1 wherein the metallic layer is aluminium.

8. A film according to claim 1 wherein the substrate is biaxially oriented.

9. A film according to claim 1 wherein the metallic layer is a vacuum metallised layer.

10. A film according to claim 1 wherein the adherent copolymer layer is exposed to a corona discharge treatment prior to application of the metallic layer.

* * * * *